Dec. 23, 1952     T. M. MOULDEN     2,622,372
COMBINED HONING AND LAPPING MACHINE
Filed Jan. 31, 1948     2 SHEETS—SHEET 1
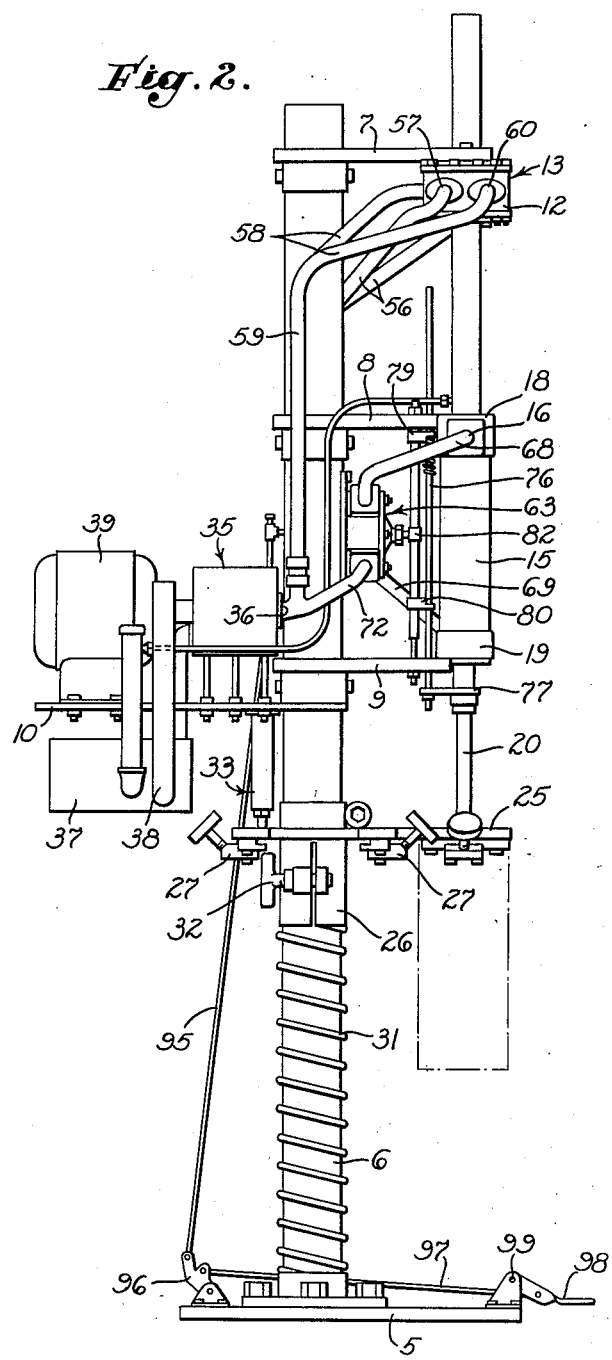
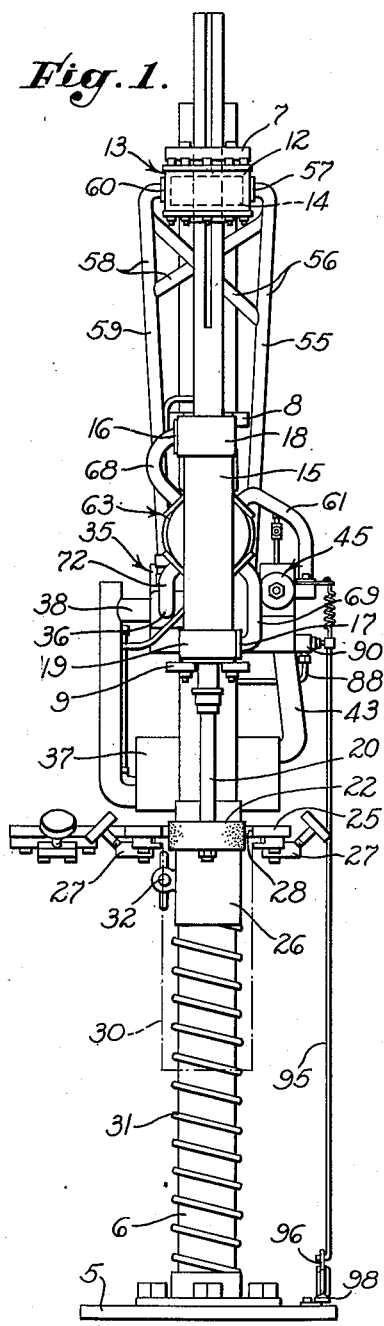
INVENTOR.
TONY M. MOULDEN
BY HIS ATTORNEYS.
HARRIS, KIECH, FOSTER & HARRIS Dec. 23, 1952     T. M. MOULDEN     2,622,372
COMBINED HONING AND LAPPING MACHINE
Filed Jan. 31, 1948                     2 SHEETS—SHEET 2
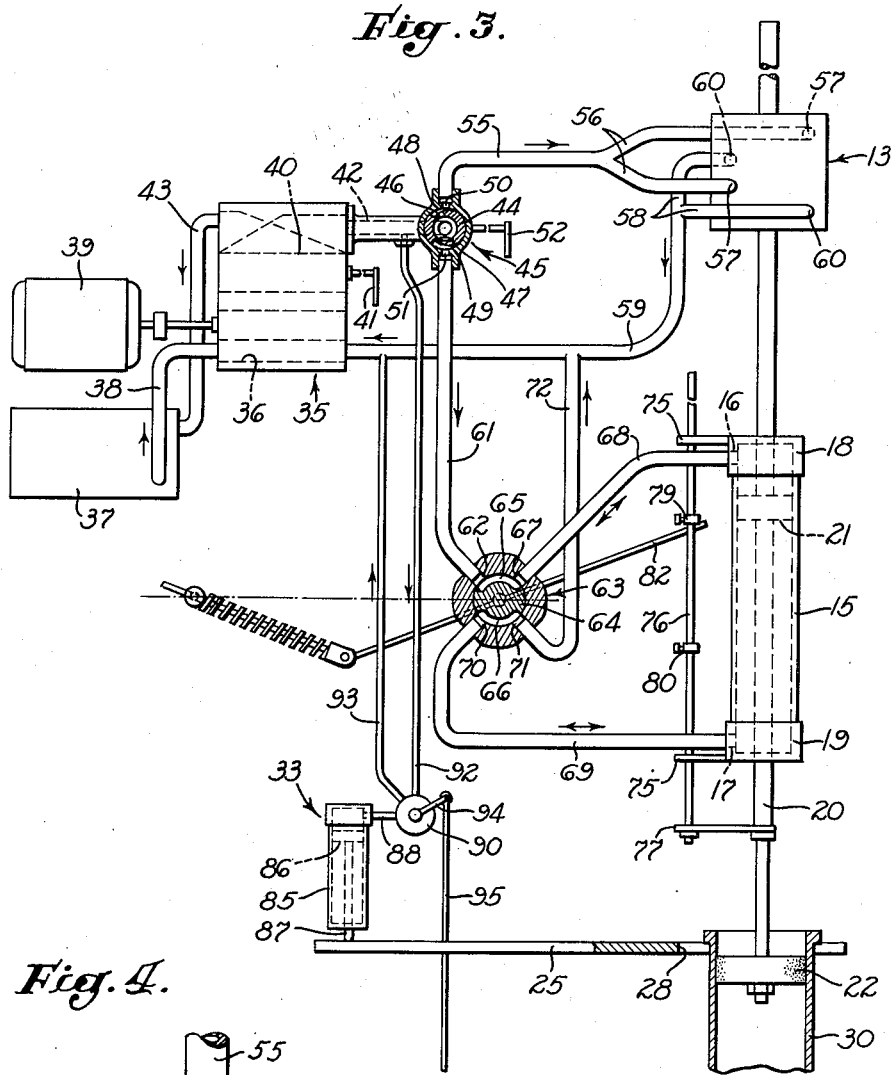
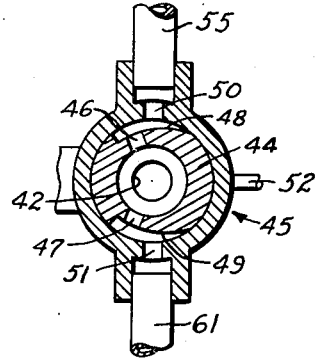
INVENTOR.
TONY M. MOULDEN
BY HIS ATTORNEYS.
HARRIS, KIECH, FOSTER & HARRIS Patented Dec. 23, 1952

2,622,372

UNITED STATES PATENT OFFICE 2,622,372

COMBINED HONING AND LAPPING MACHINE

Tony M. Moulden, Montrose, Calif.

Application January 31, 1948, Serial No. 5,661

11 Claims. (Cl. 51—34)

My invention relates to machine tools and particularly to a honing or lapping machine having a metalworking tool which is simultaneously rotated and reciprocated with respect to the work being operated upon.

One object of my invention is to provide a machine tool, of the class referred to, in which the metalworking tool is rotated and reciprocated by fluid-actuated devices.

Another object is to provide a machine tool of the type indicated embodying means for varying the ratio between the speed of rotation of the hone or lap and the rate of reciprocation thereof so that the hone or lap can be caused to reciprocate at various speeds, regardless of its rotational speed. By this means, it is possible to obtain any desired honing or lapping action in accordance with the requirements. This object is best accomplished by providing a fluid-actuated motor for rotating the spindle upon which the hone or lap is mounted, a fluid cylinder in which a piston head of the spindle is adapted to slide, fluid introduced alternately into opposite ends of the cylinder thus imparting reciprocatory movement to the spindle, a pressure fluid system for supplying fluid to the motor and cylinder, and a manually controlled proportioning valve in said system through which the fluid flows to the motor and to the cylinder, said valve being adjustable to vary the ratio of flow of the fluid to the motor and cylinder and thereby the ratio between the rotary speed and the rate of reciprocation of the spindle.

Another object of the invention is to provide a machine tool of the character referred to, in which the fluid system includes a variable delivery pump for supplying fluid to the fluid motor and cylinder, and a selector valve in said system for alternately introducing the pressure fluid into opposite ends of the spindle-reciprocating cylinder. It is a further object in this respect to provide means actuated in response to movement of the tool spindle for operating the selector valve when the spindle reaches the limit of such movement in either direction.

Another object is to provide a machine tool of the class specified embodying a work holder which is movable vertically on the machine frame and which is normally held elevated by spring means so as to locate the work piece within the range of reciprocatory movement of the lap or hone. It is a further object to provide fluid-actuated means which is adapted to force the work holder downwardly against the action of the spring means so as to lower the work piece below the operative range of movement of the hone or lap to permit placing of the work piece in the machine or its removal therefrom. This means preferably consists of a vertically disposed fluid cylinder having a piston slidable therein and having a rod projecting therefrom and adapted to engage the work holder to force the latter downwardly to inoperative position when pressure fluid is introduced into the upper end of the cylinder. Fluid for operating the cylinder is provided through a line connected in parallel with the main fluid system of the machine and a pedal-controlled valve is provided in the line for controlling the flow of fluid into the cylinder.

Further objects of the invention will appear from the following description and from the drawings, which are intended for the purpose of illustration only, and in which:

Fig. 1 is a front elevational view of the improved honing and lapping machine;

Fig. 2 is a side elevation of the same;

Fig. 3 is a diagram of the fluid system and actuating devices associated therewith; and Fig. 4 is an enlarged cross-sectional view through the proportioning valve.

Referring to the drawings in detail, the improved machine tool includes a base 5 adapted to rest upon the floor, and a tubular post 6 bolted to and projecting upwardly from the base. The post 6 carries vertically spaced brackets 7, 8, and 9 which project from one side thereof, and another bracket or support 10 which projects therefrom in the opposite direction. Secured to the lower face of the upper bracket 7 is the housing 12 of a fluid motor 13. Connected between the brackets 8 and 9, in axial alignment with the rotor 14 of the fluid motor 13, is a fluid cylinder 15 having ports 16 and 17 at its upper and lower ends, respectively. Adapted to slide vertically in end bearings 18 and 19 of the cylinder 15 and through the bore of the rotor 14 is a spindle 20. The spindle 20 is keyed to the rotor 14 and has a piston head 21 (Fig. 3) which is slidable within the cylinder 15. The lower end of the spindle 20 provides a mandrel to which a honing or lapping tool 22 may be connected.

The machine is provided with a work holder 25 which consists of a plate having a hub 26 slidable on the post 6 and carrying a plurality of clamping devices 27 adapted to clamp a work piece against the lower surface of the work holder, the plate having a slot 28 to permit the tool 22 to pass therethrough. The present machine is particularly adapted for use in honing or lapping the cylinder walls of motorcycle engines or the like, Fig. 1 showing a work piece 30 in position to be operated upon by the tool 22. The work holder 25 is normally held elevated by means of a coil spring 31 surrounding the post 6 with its lower and upper ends engaging the base 5 and the hub 26, respectively. The hub 26 is split and the sides of the split portion are adapted to be drawn together by a clamping screw 32 to retain the work holder in different positions of vertical adjustment. However, the work holder 25 is adapted to be moved downwardly against the action of the spring 31 by fluid-actuated means, indicated generally at 33 and described in detail later, so as to remove the holder from the operative zone of the tool 22 for the purpose of mounting the work piece thereon or removing it therefrom.

The fluid system for operating the fluid-actuated devices 13, 15, and 33 is arranged as next described. Supported on the bracket 19 is a fluid pump 35 which may be of the rotary gear type and including a series of meshing gears adapted to draw fluid into the inlet passage 36 of the pump from a reservoir 37 carried by the bracket 10 by way of a fluid line 38. The gear pump is operated by an electric motor 39 mounted on the bracket 10. A valve 40 rotatable in the housing of the pump 35, under the action of a manual control 41, serves to regulate the output of the pump by directing the fluid pumped by the individual sets of gears either to the discharge port 42 or to a by-pass line 43 which returns the pump fluid to the reservoir 37. By this construction, the pressure of the pumped fluid can be readily controlled to meet the requirements and to obtain maximum efficiency of operation.

The pressure fluid in the discharge port 42 is directed to the interior of the rotary element 44 of a proportioning valve 45, the fluid being adapted to flow from the element through radial openings 46 and 47 having tapered portions 48 and 49 of opposite hand (Fig. 4). The openings 46 and 47 connect with outlet ports 50 and 51 and by turning the element 44 by means of a manual control 52 the ratio between the amount of fluid discharged through the ports 50 and 51 can be varied. Connected to the outlet port 50 is a line 55 which has branches 56 connected to the inlet ports 57 of the fluid motor 13. Similar branches 58 of a line 59 are connected to the outlet ports 60 of the fluid motor 13, the other end of the line 59 being connected to the inlet port 36 of the fluid pump 35. It is thus seen that fluid pumped through the line 55 enters the rotor chamber of the motor 13 and is directed against the vanes of the rotor 14 to rotate the latter and the spindle 20 connected thereto, the speed of rotation being readily adjusted by turning the valve element 44. After the fluid has performed its work within the fluid motor 13, it is returned to the pump 35 through the line 59 to be recirculated.

Connected to the outlet port 51 of the proportioning valve 45 is a line 61 which has its other end joined to the inlet port 62 of a two-way direction control valve 63 (Fig. 3). A rotary valve element 64 within the housing of the valve 63 has peripheral grooves 65 and 66. When the element 64 is in the postion indicated in Fig. 3, the pressure fluid which enters the inlet port 62 is directed to a port 67 and line 68, which is connected to the port 16 at the upper end of the actuating cylinder 15, so that the piston 21 is forced downwardly in the cylinder. At this time, fluid is discharged from the lower end of the cylinder through the port 17 and through a line 69 which is connected to a port 70 in the housing of the valve 63. Upon entering the port 70, the fluid passes through the groove 66 to a port 71, from which it flows through a fluid line 72 connected to the return line 59 of the fluid system. The valve element 64 is adapted to be rotated through an angle sufficient to cause its groove 65 to communicate between the ports 67 and 71, and its groove 66 to connect the ports 62 and 70 so that the pressure fluid is introduced into the lower end of the actuating cylinder 15 through the line 69 and port 17 to force the piston 21 and spindle 20 upwardly, fluid within the upper end of the cylinder 15 then being forced through the port 16, line 68, groove 65 and line 72, to the return line 59. It is thus apparent that by alternately reversing the position of the valve element 64, the piston 21 and spindle 20, together with the honing or lapping tool 22, are reciprocated to move the tool alternately in opposite directions with respect to the work piece 30. Automatic means are provided for rotating the valve element 64 alternately in opposite directions, this means being constructed as next explained. Slidable vertically in apertures in fingers 75 projecting laterally from the end plates 18 and 19 of the cylinder 15 is a slide rod 76, the lower end of which is joined to the spindle 20 by means of an arm 77. Adjustably secured to the slide rod 76, between the fingers 75, is a pair of shifter elements 79 and 80 which can be adjusted toward and away from each other to vary the space therebetween. The shifter elements 79 and 80 are adapted to engage alternately with an arm 82 which projects radially from the rotary valve element 64 of the valve 63. It is thus seen that as the spindle approaches the limit of its vertical movement in either direction, the shifter element 79 or 80 will engage the arm 82 to rotate the valve element and reverse the flow of fluid into the cylinder 15 so as to alternately and automatically change the direction of movement of the spindle 20 and tool 22. By adjusting the shifter elements 79 and 80 closer together or farther apart, the extent of movement of the spindle 20 and tool 22 can be readily varied in accordance with the length of the surface of the work piece being operated upon.

It has been explained that the work support 25 is adapted to be lowered to inoperative position by fluid-actuated means 33. This means consists of a stationary vertical cylinder 85 in which a piston 86 is slidable, the piston having a rod 87 adapted to engage the work support 25 and force the latter downwardly when pressure fluid is introduced into the upper end of the cylinder through a line 88. The line 88 is connected to a two-way valve 90 which has a rotary element adapted, when in one position, to connect the line 88 with a line 92 extending from the discharge port 42 of the pump 35, and adapted, when in another position, to connect the line 88 with a return line 93 connected to the line 59. The rotary element of the valve 90 has an arm 94 to which is connected the upper end of a link 95, the lower end of the link being connected to one arm of a bell-crank lever 96 pivoted on the base 5 (Fig. 2). A second link 97 is connected between the other arm of the bell-crank lever 96 and a pedal 98 which is pivoted at 99 to the base. By this means, the valve 90 can be operated by the pedal 98 to effect lowering of the work support 25 so that the operator's hands are left free to perform the operation of clamping or unclamping the work piece 30 from the work support. When the pedal 98 is released the spring 31 acts to force the work support upwardly to operative position, that is, to a position wherein the work piece is located within the zone of reciprocatory movement of the tool 22.

While I have herein shown and described the improved machine tool as embodied in a preferred form of construction, by way of example, it will be apparent that various changes might be made in the structure without departing from the spirit of the invention. Consequently, I do not wish to be limited in this respect, but desire to be afforded the full scope of the appended claims.

I claim as my invention:

1. A machine tool, including: a frame; a spindle mounted for simultaneous rotation and reciprocatory movement on said frame and adapted to support a tool; a first variable-speed fluid-actuated means disposed on said frame and operatively connected to said spindle for rotating said spindle, said spindle being coaxial with the axis of rotation of said first variable-speed fluid-actuated means and reciprocable axially therethrough; a second variable-speed fluid-actuated means disposed on said frame and operatively connected to said spindle for reciprocating said spindle; a fluid line in fluid communication with said first and second fluid-actuated means; a fluid pump supplying fluid under pressure to said first and second fluid-actuated means to actuate the same; and a proportioning valve in said line, disposed downstream of said pump through which the fluid flows to said first and second fluid-actuated means, said valve having an inlet port in communication with said fluid pump, two outlet ports in communication with said first and second fluid-actuated means respectively, and means movable in one direction to progressively restrict flow through one of said outlet ports and simultaneously lessen restriction to flow through the other outlet port, and vice versa, thereby to vary the ratio of flow of fluid to said first and second fluid-actuated means to vary the ratio between the rate of rotary speed and the rate of reciprocatory movement of said spindle.

2. A machine tool, including: a frame; a spindle mounted for simultaneously rotation and axial reciprocatory movement on said frame and adapted to support a tool; a stationary fluid motor on said frame rotating said spindle; a fluid-actuated means including a cylinder and a piston slidable in said cylinder and connected to said spindle for reciprocating the same; a fluid conduit including a pump supplying fluid under pressure to said motor and said cylinder to operate said motor and said piston, said spindle being slidable axially through said fluid motor; an adjustable proportioning valve in said conduit through which the fluid flows to said motor and said cylinder, said valve having an inlet port in communication with said pump, two outlet ports in communication with said motor and cylinder, respectively, and means movable in one direction to progressively restrict flow through one of said outlet ports and simultaneously lessen restriction to flow through the other outlet port, and vice versa, thereby to vary the ratio of flow of fluid to said motor and said cylinder so as to vary the ratio between the rate of rotary speed and the rate of reciprocatory movement of said spindle; a selector valve in said fluid conduit operative to selectively introduce fluid into either end of said cylinder; and valve-actuating means operative in response to reciprocatory movement of said spindle to actuate said selector valve, said valve-actuating means including a shiftable arm on said selector valve, a slide rod carried by and movable with said spindle, and a pair of shifter elements adjustable longitudinally of and movable with said rod, said elements being alternately engageable with said arm at the opposite extremes of movement of said spindle so as to shift said arm alternately in opposite directions and thus reverse the flow of fluid to the ends of said cylinder.

3. A machine tool as set forth in claim 2 in which said pump is a variable delivery pump.

4. In a machine tool having a frame, a spindle mounted for simultaneous rotation and reciprocatory movement on said frame and adapted to support a tool, and fluid-actuated means for rotating and reciprocating the spindle, the combination of: a work support movably mounted on said frame for movement from an upper level within the vertical reciprocatory range of movement of the tool to a lower level below said range; a spring to move said work support from said lower level to said upper level, said spring normally supporting said work support at said upper level; and manually-controlled fluid-pressure-actuated means to force said work support downward from said upper level to said lower level against the resistance of said spring.

5. A machine tool as set forth in claim 4 which includes a foot pedal operatively connected with said fluid-pressure-actuated means for control thereof.

6. A machine tool as set forth in claim 4 in which said frame has a base portion in the form of a post and said spring is a helical spring surrounding the post.

7. A machine tool as set forth in claim 4 in which said frame comprises a vertical post with said spindle supported thereby in a position spaced laterally therefrom and said work support has a hub slidingly mounted on said post with said spring helically embracing the post below said hub.

8. A machine tool as set forth in claim 7 which includes a foot pedal operatively connected with said fluid-pressure-actuated means for control thereof.

9. A machine tool, including: a frame; a spindle mounted for simultaneous rotation and reciprocatory movement on said frame and adapted to support a tool; a first variable-speed fluid-actuated means disposed on said frame and operatively connected to said spindle for rotating said spindle; a second variable-speed fluid-actuated means disposed on said frame and operatively connected to said spindle for reciprocating the spindle; a first fluid line to deliver actuating fluid to said first fluid-actuated means; a second fluid line to deliver actuating fluid to said second fluid-actuated means; a fluid pump connected to said first and second fluid lines to deliver actuating fluid thereto; a single manually operable control means; and valve means between said pump and said two fluid lines operated by said single control means to variably divide the actuating fluid from said pump between said two fluid lines, said valve means being adjustable by said control means in one direction to progressively restrict flow to said first fluid line while simultaneously lessening restriction to flow to said second fluid line and being movable in the opposite direction to progressively restrict flow to said second fluid line while simultaneously lessening restriction to flow to said first fluid line thereby to vary the ratio between the rate of rotary speed and the rate of reciprocatory movement of said spindle.

10. A machine tool, including: a frame; a spindle mounted for simultaneous rotation and axial reciprocatory movement on said frame and adapted to support a tool; a fluid-motor disposed on said frame and operatively connected to said spindle for rotating said spindle, said spindle being coaxial with the axis of rotation of said motor and reciprocable therethrough; a fluid-actuated reciprocating motor disposed on said frame and operatively connected to said spindle for reciprocating said spindle; a fluid line in fluid communication with said fluid motor and said reciprocating motor; a fluid pump supplying fluid under pressure to said fluid motor and said reciprocating motor to operate the same; and a proportioning valve in said line disposed downstream of said pump through which the fluid flows to said fluid motor and said reciprocating motor, said valve having an inlet port in communication with said pump, two outlet ports in communication with said fluid motor and said reciprocating motor, respectively, and means movable in one direction to progressively restrict flow through one of said outlet ports and simultaneously lessen restriction to flow through the other outlet port, and vice versa, thereby to vary the ratio between the rate of rotary speed and the rate of reciprocatory movement of said spindle.

11. A machine tool, including: a frame; a spindle mounted for simultaneous rotation and axial reciprocatory movement on said frame and adapted to support a tool; a stationary fluid motor on said frame rotating said spindle; a fluid-actuated means including a cylinder and a piston slidable in said cylinder and connected to said spindle for reciprocating the same; a fluid conduit including a variable-delivery pump supplying fluid under pressure to said motor and said cylinder to operate said motor and said piston, said spindle being slidable axially through said fluid motor; and an adjustable proportioning valve in said conduit through which the fluid flows to said motor and said cylinder, said valve having an inlet port in communication with said pump, two outlet ports in communication with said motor and said cylinder, respectively, and means movable in one direction to progressively restrict flow through one of said outlet ports and simultaneously lessen restriction to flow through the other outlet port, and vice versa, thereby to vary the ratio between the rate of rotary speed and the rate of reciprocatory movement of said spindle.

TONY M. MOULDEN.

REFERENCES CITED

The following references are of record in the file of this patent:

UNITED STATES PATENTS

| Number | Name | Date |
|---|---|---|
| 545,596 | Legg | Sept. 3, 1895 |
| 890,065 | Kellow | June 9, 1908 |
| 1,128,091 | Barnes | Feb. 9, 1915 |
| 1,453,931 | Flick | May 1, 1923 |
| 1,662,792 | Osgood | Mar. 13, 1928 |
| 1,877,572 | Harrison | Sept. 13, 1932 |
| 1,882,814 | Haas | Oct. 18, 1932 |
| 1,950,936 | Baumberger | Mar. 13, 1934 |
| 1,973,150 | Morgan | Sept. 11, 1934 |
| 2,079,640 | Vickers | May 11, 1937 |
| 2,114,349 | Johnson | Apr. 19, 1938 |
| 2,167,758 | Johnson | Aug. 1, 1939 |
| 2,268,023 | Fairbairn | Dec. 30, 1941 |
| 2,270,590 | Johnson | Jan. 20, 1942 |
| 2,459,902 | Tucker | Jan. 25, 1949 |